US012752903B2

(12) United States Patent
Ballestero Méndez et al.

(10) Patent No.: US 12,752,903 B2
(45) Date of Patent: Oct. 6, 2026

(54) AIRCRAFT FUSELAGE SECTION

(71) Applicant: AIRBUS OPERATIONS, S.L.U., Madrid (ES)

(72) Inventors: Jorge Ballestero Méndez, Madrid (ES); Ana Fernández Ramírez, Madrid (ES); Nuria Colmenarejo Matellano, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 18/990,545

(22) Filed: Dec. 20, 2024

(65) Prior Publication Data

US 2025/0206433 A1 Jun. 26, 2025

(30) Foreign Application Priority Data

Dec. 22, 2023 (EP) .................................... 23383359

(51) Int. Cl.

| | |
|---|---|
| ***B64C 1/06*** | (2006.01) |
| ***B64C 1/18*** | (2006.01) |
| ***B64D 37/32*** | (2006.01) |
| *B64D 37/30* | (2006.01) |

(52) U.S. Cl.

CPC ................ *B64C 1/062* (2013.01); *B64C 1/18* (2013.01); *B64D 37/32* (2013.01); *B64D 37/30* (2013.01)

(58) Field of Classification Search

CPC ................................ B64C 1/062; B64D 37/32

See application file for complete search history.

(56) References Cited

U.S. PATENT DOCUMENTS 3,480,058 A 11/1969 Harr
3,687,401 A * 8/1972 Moore .................... B64C 1/062 244/119

(Continued)

FOREIGN PATENT DOCUMENTS

DE 102009020891 A1 * 11/2010 ............. B64C 1/062
EP 4606695 A1 * 8/2025 ............. B64D 27/30

(Continued)

OTHER PUBLICATIONS

Extended European Search Report for EP Application No. 23383359.9 dated Jul. 15, 2024, 10 pages.

(Continued)

*Primary Examiner* — Joseph W Sanderson
(74) *Attorney, Agent, or Firm* — Nixon & Vanderhye P.C.

(57) ABSTRACT

An aircraft fuselage section extending along a longitudinal direction including: a fuselage structure comprising a plurality of frames; a floor connected to the fuselage structure; a cushioning element arranged on the floor, and a crash absorption assembly between the fuselage structure and the floor, wherein the crash absorption assembly includes first absorption elements and second absorption elements distributed along the longitudinal direction, wherein the first absorption elements and the second absorption elements are configured to dissipate and distribute energy; and wherein the first absorption elements are each arranged at a position corresponding to a frame of the fuselage structure and the second absorption elements are each arranged at a position between successive frames of the fuselage structure.

16 Claims, 7 Drawing Sheets

(56) References Cited

U.S. PATENT DOCUMENTS

| | | | | | |
|---|---|---|---|---|---|
| 3,718,295 | A * | 2/1973 | Moore | B62D 39/00 | 244/119 |
| 8,142,873 | B2 * | 3/2012 | Buellesbach | B64C 1/062 | 428/116 |
| 8,376,275 | B2 * | 2/2013 | Bolukbasi | B64C 1/062 | 244/119 |
| 8,814,092 | B2 * | 8/2014 | Milliere | B64C 1/062 | 244/121 |
| 9,162,745 | B2 * | 10/2015 | Mayer | B64C 1/062 | |
| 9,266,600 | B2 * | 2/2016 | Milliere | B64C 1/062 | |
| 9,371,126 | B2 * | 6/2016 | Siemetzki | B64C 1/062 | |
| 9,517,831 | B2 * | 12/2016 | Fink | B64C 1/062 | |
| 9,616,988 | B2 * | 4/2017 | Littell | B64C 1/062 | |
| 9,617,013 | B2 * | 4/2017 | Mairou | B64C 27/04 | |
| 9,623,950 | B2 * | 4/2017 | Fink | B64D 37/06 | |
| 12,078,457 | B2 * | 9/2024 | Collombet | B64C 1/062 | |
| 12,312,064 | B2 * | 5/2025 | Carr | B64D 37/04 | |
| 12,384,512 | B2 * | 8/2025 | Durand | B64C 1/00 | |
| 2009/0206202 | A1 * | 8/2009 | Bolukbasi | B64C 1/062 | 244/121 |
| 2011/0042513 | A1 * | 2/2011 | Milliere | B64C 1/064 | 244/121 |
| 2011/0212291 | A1 * | 9/2011 | Buellesbach | B64C 1/062 | 428/116 |
| 2013/0112811 | A1 * | 5/2013 | Mayer | B64C 1/062 | 244/119 |
| 2014/0001312 | A1 * | 1/2014 | Milliere | B64C 1/062 | 244/121 |
| 2015/0122940 | A1 * | 5/2015 | Mairou | B64C 27/04 | 244/17.11 |
| 2015/0136906 | A1 * | 5/2015 | Fink | B64C 1/18 | 244/119 |
| 2015/0151828 | A1 * | 6/2015 | Siemetzki | B64C 1/062 | 244/121 |
| 2015/0225063 | A1 * | 8/2015 | Littell | B64C 1/062 | 244/119 |
| 2015/0307178 | A1 * | 10/2015 | Fink | B64D 37/04 | 244/119 |
| 2022/0404124 | A1 * | 12/2022 | Collombet | B64D 11/0619 | |
| 2023/0095015 | A1 * | 3/2023 | Carr | B64D 37/32 | 244/135 R |
| 2025/0196988 | A1 * | 6/2025 | Durand | B64C 1/00 | |
| 2025/0196989 | A1 * | 6/2025 | Durand | F16F 7/12 | |

FOREIGN PATENT DOCUMENTS

| | | | | |
|---|---|---|---|---|
| EP | 4640564 | A1 * | 10/2025 | B64D 37/04 |
| FR | 3068334 | A1 * | 1/2019 | B64D 25/00 |
| FR | 3074775 | A1 * | 6/2019 | B64C 1/062 |
| FR | 3096029 | A1 | 11/2020 | |

OTHER PUBLICATIONS

Xianfei Zhu et al., “Evaluate the Crashworthiness Response Of An Aircraft Fuselage Section With Luggage Contained In The Cargo Hold”, International Journal of Crashworthiness, vol. 22, No. 4, Apr. 4, 2017, pp. 347-364.

* cited by examiner

AIRCRAFT FUSELAGE SECTION

RELATED APPLICATION

This application incorporates by reference and claims priority to European patent application EP23383359.9, filed Dec. 22, 2023.

TECHNICAL FIELD

The present invention is in the technical field of hydrogen powered aircraft and particularly an aircraft fuselage section that is crashworthy.

BACKGROUND

In response to the environmental imperatives associated with conventional fossil fuel-based aircraft propulsion, the aviation industry is undergoing a notable shift towards exploring cleaner and more sustainable alternatives. The emission of contaminants from traditional aircraft fuels has raised concerns about its contribution to climate change and air quality degradation. In response to these challenges, there has been a growing interest in developing alternative solutions based on cleaner fuel sources.

In particular, hydrogen has emerged as a promising candidate due to its high energy density, zero carbon emissions at the point of use, and for having a potential for sustainable production methods, particularly through green hydrogen derived from renewable energy sources. Unlike traditional hydrocarbon-based fuels, the combustion of hydrogen produces only water vapor as a byproduct, making it an environmentally friendly option for reducing the carbon footprint of aviation.

However, one of the significant challenges from implementing hydrogen as a fuel for aircraft engines is the storage and distribution of hydrogen since it has low volumetric energy density, requires specialized infrastructure and particular storage conditions.

The promise of hydrogen lies not only in its clean combustion but also in its potential to revolutionize the entire aviation fuel landscape. However, reaching this potential is contingent on overcoming significant technical challenges. The development of specialized infrastructure for hydrogen storage and distribution, as well as the adaptation of aircraft engines for hydrogen combustion or fuel tank integration, requires concerted efforts and investments.

Hydrogen, as a fuel, presents a notable challenge due to its ultralight nature. The intrinsic complexities in storing hydrogen in its natural state prompt the necessity for sophisticated technical solutions to enhance density and reduce storage facility dimensions. Notwithstanding advancements in diverse hydrogen storage methods, each methodology exhibits distinctive merits and constraints. Addressing these storage challenges demands ongoing research and development efforts to augment the efficiency, scalability, and cost-effectiveness of hydrogen storage technologies.

Focusing on the potential implementation of liquid hydrogen in civil aviation, a main challenge will be the crashworthiness consideration of the overall aircraft and, more particularly, of the fuel tank. In those cases, the aircraft should be able to ensure a safe operation in case of emergency landing, wheels up landing, and fuselage crash survivability.

Currently, crashworthiness is key in aircraft design. In eventual plane accidents, it is essential to protect the elements responsible for fuel storage in the aircraft as much as possible. The fuel is usually stored in wings or horizontal stabilizers and, in few exceptions, extra tanks are located in the central fuselage for extra-long range versions. There is a need in the art for a crashworthiness concept which may provide, to the unpressurized rear fuselage section of an aircraft, the sufficient amount of energy absorption, dissipation and distribution along the fuselage in case of emergency, for example during a plane crash.

SUMMARY

In a first inventive aspect, the invention may be embodied as an aircraft fuselage section extending along a longitudinal direction, wherein the aircraft fuselage section comprises: a fuselage structure comprising a plurality of frames, a floor connected to the fuselage structure, a cushioning element arranged on the floor, and crash absorption assembly arranged between the fuselage structure and the floor, wherein the crash absorption assembly comprises a plurality of first absorption elements and a plurality of second absorption elements distributed along the longitudinal direction, the plurality of first absorption elements and the plurality of second absorption elements being configured for dissipating and distributing energy; wherein the first absorption elements are each arranged at a position corresponding to a frame of the fuselage structure and the second absorption elements are each arranged at a position between successive frames of the fuselage structure.

The aircraft fuselage section may be embodied with improved kinetic energy absorption capacities. The aircraft fuselage section comprises a fuselage structure, a floor connected to said fuselage structure, a cushioning element arranged on the floor and crash absorption assembly arranged between the fuselage structure and the floor.

The combination of the previously mentioned elements ensures that any additional element, such as a fuel storage tank, located inside the fuselage section and over the cushioning element would be protected during a crash event. In case of a crash event, the cushioning element performs a braking and protective action on the additional element and transfers to the floor the pressure loads generated in the braking. At the same time, the cushioning element prevents eventual major damages of both the structure of the additional element and the floor. Also, the crash absorption assembly configuration helps dissipating and distributing energy inside the fuselage section during the crash event, more particularly, kinetic energy. This allows maximizing the absorption of kinetic energy during a crash event, while protecting the structural integrity of the additional element.

In particular, the dissipation and distribution of the energy is ensured by the crash absorption assembly which are arranged between the fuselage structure and the floor. The crash absorption assembly comprise a plurality of first absorption elements and a plurality of second absorption elements distributed along the longitudinal direction.

The first absorption elements are each arranged at a position corresponding to a frame of the fuselage structure and the second absorption elements are each arranged at a position between successive frames of the fuselage structure. In other words, the invention provides a repetitive pattern of crash absorption assembly where any first absorption element of the crash absorption assembly is located in between two second absorption elements and any second absorption element is located in between two first absorption elements, except for the absorption elements located at both ends of the distribution of crash absorption elements along the longitudinal direction.

The specific arrangement of the first and second absorption elements along the fuselage structure, in particular corresponding to a frame of the fuselage or in between successive frames of the fuselage structure, ensures both transverse and longitudinal dissipation and distribution of the energy.

Additionally, the present invention may be embodied to provide further advantages such as efficient energy absorption, dissipation and load distribution with potential weight reduction with respect to the solutions known in the state of the art for aircraft fuselage section. Also, the invention permits reducing the distance between the tank and the fuselage structure and, by doing so, it is possible to increase the tank diameter and reduce its length, and thus the aircraft fuselage length when dimensioning said aircraft. This would enable both tank and fuselage structure weight savings. Finally, the cushioning element alleviates the rest of the fuselage section, in particular the frames of the fuselage structure, to hold high acceleration peaks and the inertia loads generated during an eventual crash event.

The fuselage of an aircraft is normally divided into three main components: a tapered nose section which houses at least a portion of the cockpit from where the crew controls the operation of the aircraft, a substantially tubular section housing the passenger cabin, and a tapered tail cone. In particular, the structure of the aircraft comprises an unpressurized rear fuselage which starts at the end of the cabin and extends until the rear fuselage end, which can also be referred to as tail cone.

Once the aircraft fuselage section is implemented as part of an aircraft, the longitudinal direction of the aircraft fuselage section corresponds to the longitudinal axis of said aircraft, and a direction perpendicular to the longitudinal direction is a direction contained in the plane defined by the pitch axis and the yaw axis of the aircraft (i.e., the horizontal and vertical axes when considering a straight cruise flight).

In an embodiment, the cushioning element extends over a region of the floor.

In an embodiment, the crash absorption assembly are arranged between the fuselage structure and at least a portion of the region of the floor over which the cushioning element extends.

In an embodiment, the first absorption elements are arranged extending along a direction perpendicular to the longitudinal direction. In an embodiment, the first absorption elements are each arranged along a portion of the corresponding frame of the fuselage structure.

In an embodiment, the second absorption elements are arranged extending along the longitudinal direction or parallel to the longitudinal direction. In an embodiment, the second absorption elements are each arranged extending over a region between successive frames of the fuselage structure.

Further embodiments combine the previous embodiments regarding the plurality of first absorption elements and the plurality of second absorption elements.

In an embodiment, the second absorption elements are located in a central region in between each pair of first absorption elements, that is, in between two frames of the fuselage structure. By central region, it should be understood that the second absorption means are distributed essentially evenly with respect to the middle of the fuselage section defined in a cross-section view.

In an embodiment, the aircraft fuselage section further comprises at least one fuel storage tank arranged over the cushioning element.

This embodiment of the present invention helps protecting the structural integrity of the at least one fuel storage tank in case of a crash event.

Advantageously, the invention helps maximizing the sizing of the at least one fuel storage tank, in particular its cross-section and volume, by enabling an efficient solution which maximizes the absorption of kinetic energy during a crash event, while protecting the structural integrity of the fuel storage tank.

It shall be understood that the at least one fuel storage tank is configured for housing a fuel within. In an embodiment, the at least one fuel storage tank is a cryotank configured for housing liquid hydrogen (LH2) or any other suitable fuel used in the aircraft industry.

In an embodiment, the at least one fuel storage tank stores hydrogen ($H_2$).

In an embodiment, the fuel storage tank has a cylindrical or conical section.

In an embodiment, the at least one fuel storage tank is arranged over the floor, the cushioning element and the crash absorption assembly. In a particular embodiment, the floor, the cushioning element and the crash absorption assembly are arranged below the at least one fuel storage tank and extend, along the longitudinal direction, further than the length of the at least one fuel storage tank. In another particular embodiment, the floor, the cushioning element and the crash absorption assembly are arranged below the at least one fuel storage tank and the length of the floor, the cushioning element and the crash absorption assembly match the length of the at least one fuel storage tank. The length of the crash absorption assembly shall be understood as the length along which the first and second crash absorbing elements are arranged.

In an embodiment, the fuel storage tank has a cylindrical or conical section and the length of the cushioning element matches the length of said cylindrical or conical section.

In an embodiment, the fuel storage tank is arranged such that there is a gap between the fuel storage tank and the cushioning element. Advantageously, the gap between the fuel storage tank and the cushioning element helps preventing, or at least minimizing, the potential coupling between said fuel storage tank and the fuselage structure during normal operation.

In an embodiment, in case of a crash event, the fuel storage tank will enter in contact with the cushioning element first, before the fuselage structure enters in contact with the crash absorption assembly, the cushioning element will be able to reduce the fuel storage tank kinetic energy and distribute the pressure loads over the area of contact between the fuel storage tank and the cushioning element. As a reaction force, the cushioning element will transfer and distribute said pressure load over a specific area of the floor. Also, the plurality of first absorption elements and the plurality of second absorption elements may be in contact with the fuselage structure at the same time in case of a crash event so that the efficiency of the transfer and distribution of the kinetic energy is enhanced.

In an embodiment, the aircraft fuselage section comprises a protective layer located between the fuel storage tank and the cushioning element. Advantageously, the protective layer between the fuel storage tank and the cushioning element helps preventing, or at least minimizing, the potential coupling between said fuel storage tank and the fuselage structure during normal operation. In an operative mode, when the aircraft fuselage section is implemented as part of an aircraft and a crash occurs, the protective layer will be in contact with both the fuel storage tank and the cushioning element at the same time. In particular, the fuel storage tank sinks down into the protective layer and said protective layer helps adding additional dissipation capacities of the kinetic energy.

In an embodiment, the at least one fuel storage tank is a single fuel storage tank. In another embodiment, the at least one fuel storage tank is a plurality of fuel storage tanks.

In an embodiment, the aircraft fuselage section comprises two fuel storage tanks arranged in a tandem configuration, in a side-by-side configuration or in an up-down configuration.

A tandem configuration shall be understood as the configuration wherein the fuel storage tanks are arranged consecutively one after the other along the longitudinal direction of the aircraft fuselage section.

A side-by-side configuration shall be understood as the configuration wherein the fuel storage tanks are arranged with their respective longitudinal axes being substantially parallel to each other, that is, one next to the other according to a horizontal axis perpendicular to both the longitudinal axis and the vertical axis.

An up-down configuration shall be understood as the configuration wherein the fuel storage tanks are arranged in a stacked configuration, that is, one above the other according to a vertical direction of the aircraft fuselage section.

In an embodiment, the aircraft fuselage section is an unpressurized rear section of the fuselage. In an embodiment, the aircraft fuselage section comprises a substantially tubular section and/or a tail cone.

In an embodiment, a first fuel storage tank is arranged in the substantially tubular section of the aircraft fuselage section and a second fuel storage tank is arranged in the tail cone of the aircraft fuselage section. In an embodiment, the second fuel storage tank has a central portion with a substantially tapered geometry that allows it to fit to the tapered tail cone, thus optimising the volume available for storing fuel while allowing to maintain a clearance with respect to the fuselage structure.

In an embodiment, the cushioning element, the floor and the crash absorption assembly extend in the longitudinal direction along the whole length of the first and second fuel storage tanks, thus providing crash protection to both fuel storage tanks. In an embodiment, the cushioning element, the floor and the crash absorption assembly do not extend in the longitudinal direction along the length of the first or the second fuel storage tank, thus providing crash protection to one fuel storage tank only.

In an embodiment, the cushioning element, the floor and the crash absorption assembly extend in the longitudinal direction along the length of the first fuel storage tank and the aircraft fuselage section comprises a second cushioning element, a second floor and second crash absorption assembly extending in the longitudinal direction along the length of the second fuel storage tank. Thus, both fuel storage tanks are protected from crash.

In an embodiment, the floor and the crash absorption assembly extend in the longitudinal direction along the whole length of the first and second fuel storage tanks, the cushioning element extends in the longitudinal direction along the length of the first fuel storage tank and the aircraft fuselage section comprises a second cushioning element extending in the longitudinal direction along the length of the second fuel storage tank. Thus, each fuel storage tank has a corresponding cushioning element.

In an embodiment, the floor is flat.

In an embodiment, the floor is curved. In a particular embodiment, the floor has a curvature substantially matching the curvature of the aircraft fuselage section. In a particular embodiment, the floor has a curvature substantially matching the curvature of the fuel storage tank.

In an embodiment, the protective layer is made of an elastomeric material. Advantageously, the elastomeric material helps absorbing small relative displacements between the fuel storage tank and the cushioning element.

The term "elastomeric" refers to a polymer material having rubber-like properties such as a material having the capacity to regain its original form when a load is removed from said material.

In an embodiment, the aircraft fuselage section comprises attaching fastener configured to attach the at least one fuel storage tank to the fuselage structure.

The attachment of the at least one fuel storage tank to the fuselage structure may be performed using discrete attachment joints, such as lugs, fittings and/or rods, using continuous attachment joints, such as band-clamps and/or straps, or using any combination thereof.

In an embodiment, the attaching fastener comprises lugs, fittings, rods, band-clamps, straps or any combination thereof.

In an embodiment, the fuel storage tank is arranged resting on at least a portion of the attaching fastener.

In an embodiment, additionally to the attaching fastener configured to attach the at least one fuel storage tank to the fuselage structure, the aircraft fuselage section comprises at least one safety belt configured to retain the at least one fuel storage tank in case of a crash event. The at least one safety belt would actuate only in case of a crash event, helping the attaching fastener to overcome the high acceleration peaks and the associated inertia loads. In an embodiment, the safety belt is implemented as a band-clamp or strap attached to the fuselage structure. In an embodiment, the aircraft fuselage section comprises a plurality of safety belts.

A strap shall be understood as a strip or band of material used for securing, holding together or clamping an object in position. The strap may be formed of materials, alone or in combination, for manufacturing the described straps are textile materials with fibers of materials such as nylon, polyamide, Ultra-high-molecular-weight polyethylene ("UHMWPE"), or metallic materials.

In an embodiment, the straps are arranged such as to form substantially a U-shape.

In an embodiment, the straps are arranged such as to form substantially an L-shape.

In an embodiment, the straps are arranged such as to form a closed loop, with both attaching fastener being attached to the same part of the fuselage structure.

In an embodiment the fuel storage tank is made of composite or metal.

In an embodiment, the first absorption elements and/or the second absorption elements are made of materials including one or more of: metallic, aluminum alloys titanium alloys; or made of composite material such as epoxy resin, foam; and combinations thereof.

A metallic absorption element provides a damage propagation/distribution which helps dissipating energy more efficiently by plastic deformation which takes place during crushing of the element, or elements, during a crash event.

A composite absorption element provides a damage propagation/distribution which helps dissipating energy more efficiently by means of collapsing, tearing or bearing which takes place during crushing of the element, or elements, during a crash event. In the particular case of composite absorption elements, some specific composite such as foam or honeycomb shaped core are able to provide collapsing, tearing or bearing capacities combined with plastic deformation capacities.

In an embodiment, the first and/or second absorption elements are made of carbon, glass, aramid and/or Ultra-High-Molecular-Weight Polyethylene (UHMWPE) fibers combined with high-performance epoxy resins and/or special foams.

In an embodiment, the first absorption elements and/or the second absorption elements: are configured to undergo plastic deformation during a crash event; and/or are configured to collapse and/or tear out during a crash event.

In the embodiment where the first absorption elements and/or the second absorption elements are configured to undergo plastic deformation, said absorption elements are may be made of metal and are able to dissipate energy in such a way that it ensures a propagation/distribution of damage due to a crash event. In a particular embodiment, the first absorption elements and/or the second absorption elements are one or more cylindrically shaped portions.

In an embodiment, the floor comprises a panel and supporting elements, wherein the supporting elements comprise a plurality of longitudinal beams extending in the longitudinal direction and a plurality of transversal beams extending perpendicularly to the longitudinal beams; wherein the longitudinal beams are connected to the transversal beams and one or more transversal beams are connected to the fuselage structure.

Advantageously, the structure of the floor according to this embodiment provides increased rigidity and resistance of the floor in order to withstand loads generated by a crash event. In particular, the stability is enhanced thanks to the overall distribution of the supporting elements along both the longitudinal direction and the perpendicular direction.

In an embodiment, the longitudinal beams and the transversal beams are equally and homogeneously distributed along the floor in order to provide even resistance capacities to the surface defined by the floor. In an embodiment, the longitudinal beams and the transversal beams are unequally distributed along the floor.

In an embodiment, the floor is substantially flat and both the longitudinal beams and transversal beams are substantially straight. In an embodiment, the floor is curved, the longitudinal beams are substantially straight and the transversal beams are curved and extend in the plane perpendicular to the longitudinal direction. In particular, the curved floor has a higher resistance with respect to a flat floor which provides better support to compression loads arisen during a crash event.

In an embodiment, the floor is made of composite material and/or metal.

In an embodiment, the cushioning element comprises a plurality of cushioning portions configured to be assembled with each other. In this particular embodiment, the plurality of cushioning portions facilitate the installation and transport of the cushioning element. In an embodiment the cushioning portions have similar cross-sections, thus providing a substantially continuous surface when assembled with each other.

In an embodiment, the cushioning element comprises a single cushioning portion. In an embodiment, the cushioning portion is substantially of the size of the fuel storage tank.

In an embodiment, the cushioning element is concave-shaped.

In an embodiment, a first portion of the cushioning element has a shape that substantially matches with the concave shape of the fuselage structure. In particular, the curvature of both the first portion of the cushioning element and the fuselage structure match.

In an embodiment, a second portion of the cushioning element has a shape that substantially matches with the shape of the fuel storage tank. In particular, the curvature of both the second portion of the cushioning element and the fuel storage tank match.

In an embodiment, the cushioning element comprises foam, a permanent inflatable means or temporary inflatable means, such as a balloon, In an embodiment where the cushioning element comprises foam. The foam may have a specific density in order to adapt the stiffness mechanical properties of the cushioning element to a desired behavior. In that sense, the cushioning element of this embodiment helps minimizing the stress level generated over the fuel storage tank surface area.

In some particular embodiments, the cushioning element is fully made of foam.

In other particular embodiments, only the outer surface of the cushioning element is made of foam.

In an embodiment, the cushioning element has a specific thickness which allow said cushioning element to enter in direct contact with the surface area of the fuel storage tank in case of a crash event. The specific thickness of the cushioning element is the thickness, or distance, which is comprised in the available space between the floor and the fuel storage tank.

In an embodiment, where the cushioning element comprises permanent inflatable means, said permanent inflatable means are made of pneumatic material such as inflatable panels. The permanent inflatable means are filled to a particular pressure in order to ensure the function of loads transfer from the cushioning element to the floor while minimizing the stress level generated over the surface area of the fuel storage tank.

In an embodiment, both foam and permanent inflatable means can be combined as a particular embodiment. In a particular embodiment, the foam has a low stiffness value in order to protect the surface area of the fuel storage tank and the permanent inflatable means have a low to medium stiffness value.

In an embodiment where the cushioning element comprises temporary inflatable means such as airbags, said temporary inflatable only inflates in case of a crash event through a pyrotechnic system or similar.

In an embodiment, the cushioning element includes an airbag with a regulation valve in order to control overpressure and absorb kinetic energy, for example, by gas expansion.

In an embodiment, the aircraft fuselage section comprises a substantially cylindrical upper shell configured to maximize fuel tank storage capacity and a substantially vertical elliptical lower shell to enhance the crashworthiness capabilities of the fuselage structure to transfer the compression loads arisen during the crash event.

In an embodiment, the crash absorption assembly are connected to the fuselage structure at a lower side of the floor, at the fuselage inner side, at the inner side of the plurality of frames, or any combination thereof.

In a second inventive aspect, the present invention provides an aircraft comprising an aircraft fuselage section according to any embodiment of the first inventive aspect of the invention.

In an embodiment, the lower part of the fuselage of the aircraft has an elliptical shape in order to improve load transfer to the fuselage frames and the more circular upper part of said fuselage. The elliptical shape improves the crashworthiness performance of the fuselage structure.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from embodiments of the invention, given just as examples and not being limited thereto, with reference to the drawings.

DETAILED DESCRIPTION

Figure 1:
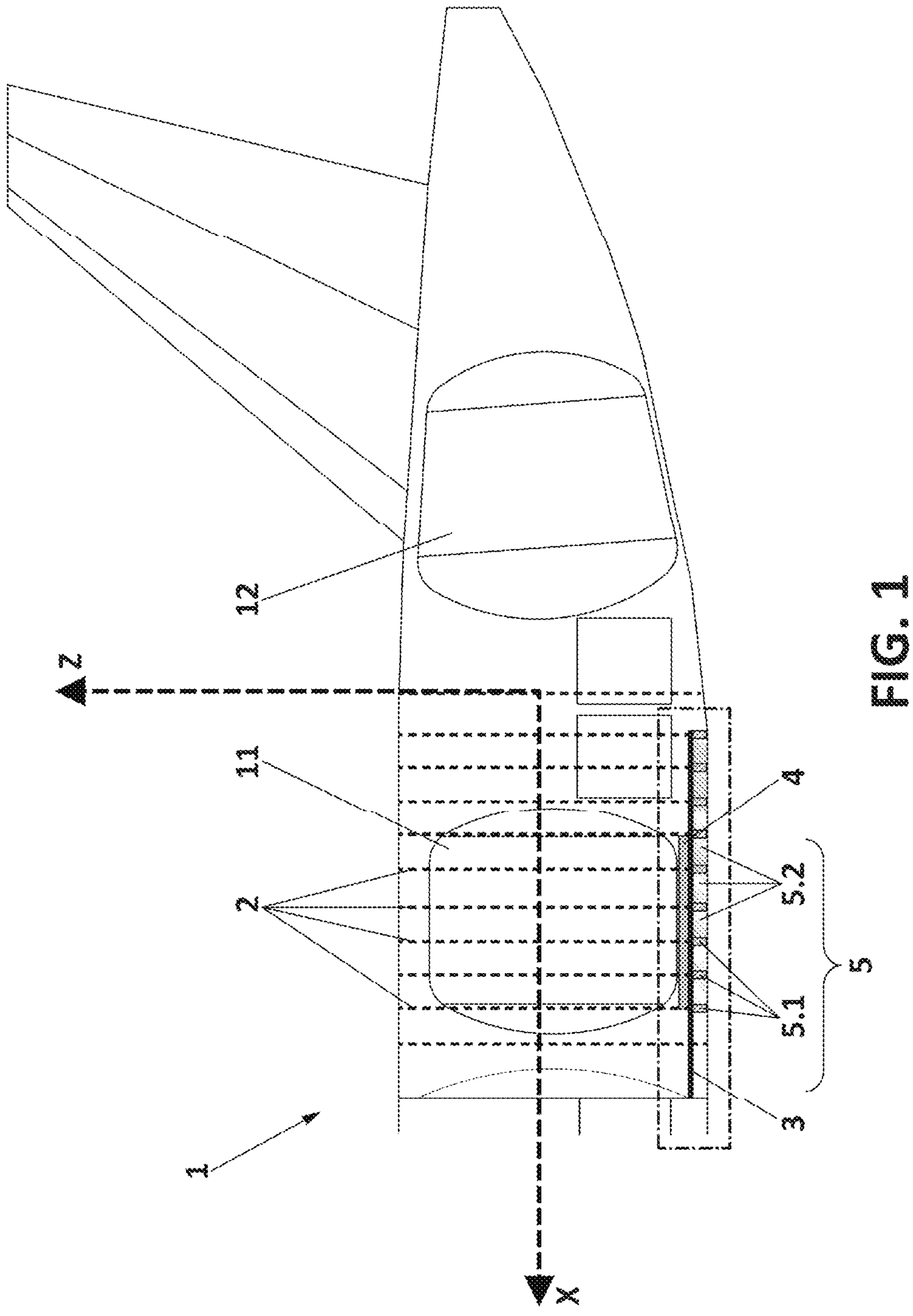
FIG. 1 is a schematic representation of a longitudinal section view of an aircraft fuselage section according to an embodiment of the invention.

FIGS. 1 to 5 show a schematic representations of a longitudinal section view of an aircraft fuselage section (1) according to an embodiment of the invention. In particular, the aircraft fuselage section (1) shows a fuselage structure comprising a plurality of frames (2) covered by a skin (9). The interior (10) of fuselage structure includes a floor (3) supported by the frames and thereby connected to the fuselage structure. Cushioning element (4) is arranged on the floor (3) and located below a first fuel storage tank (11). The aircraft fuselage section (1) of FIG. 1 also depicts crash absorption assembly (5) arranged between the fuselage structure and the floor (3).

The crash absorption assembly (5) comprises a plurality of first absorption elements (5.1) and a plurality of second absorption elements (5.2) distributed along the longitudinal direction (X). The plurality of first absorption elements (5.1) and the plurality of second absorption elements (5.2) being configured for dissipating and distributing energy in order to limit the transfer of energy to the first fuel storage tank (11) in case of a crash plane.

As shown in FIG. 1, the first absorption elements (5.1) are each arranged at a position corresponding to a frame (2) and the second absorption elements (5.2) are each arranged at a position between successive frames (2) of the fuselage structure.

The first absorption elements (5.1) may be strips, bars or other deformable structures that have a width corresponding to a width of a frame to which the first absorption element corresponds. The first absorption elements may be mounted to the corresponding frame and have upper surfaces which support the cushioning element. The first absorption elements may be aligned in a plane perpendicular to the longitudinal direction (X).

The second absorption elements (5.2) extend substantially along the longitudinal direction (X) and are in gaps between successive ones of the frames. The second absorption elements (5.2) may substantially fill or fill a majority of the gaps between successive frames in a region between the cushioning element and the skin.

In the particular embodiment depicted in FIG. 1, the aircraft fuselage section (1) also comprises a second fuel storage tank (12) which is free of cushioning element or crash absorption assembly because, in this configuration of the tanks, the second fuel storage tank is less prone to crash. In other embodiments, not shown in the set of figures, the area where the second fuel storage tank (12) is arranged or even the whole aircraft fuselage section (1) is fully protected by cushioning element and/or crash absorption assembly. In other embodiments, the aircraft fuselage section (1) does not include more than one fuel storage tank.

In an embodiment, the first absorption elements (5.1) and/or the second absorption elements (5.2) are formed of materials that include one or more of: metallic, aluminum alloys or titanium alloys; and/or composite material, such as epoxy resin, foam or any combination thereof; or any combination thereof.

In an embodiment, the first absorption elements (5.1) and/or the second absorption elements (5.2) are configured to undergo plastic deformation during a crash event and/or are configured to collapse and/or tear out during a crash event.

Figure 2:
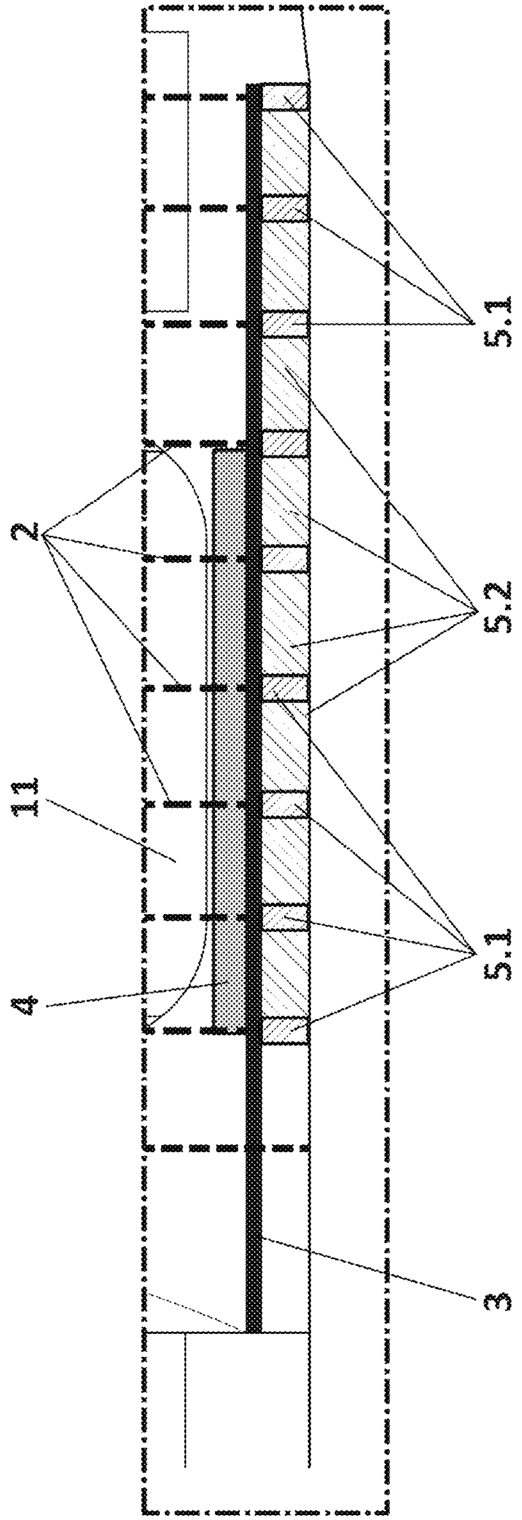
FIG. 2 is a more detailed schematic representation of a longitudinal section view of an aircraft fuselage section according to the embodiment of the invention of FIG. 1.

FIG. 2 shows a more detailed view of a portion of the elements located below the first fuel storage tank (11) of the aircraft fuselage section (1). In particular, FIG. 2 depicts the layout of the floor (3), the cushioning element (4) and the crash absorption assembly (5). As shown in this figure, the crash absorption assembly (5) are arranged in such a way that the first absorption elements (5.1) are disposed at a position matching with the frames (2) of the fuselage structure and the second absorption elements (5.2) are arranged in between frames (2), that is in between first absorption elements (5.1). In other words, there is a sequential distribution of first absorption elements (5.1) and second absorption elements (5.2) along the longitudinal direction (X).

In an embodiment, the set-up of the elements of the invention is responsible for the fuel storage tank (11) getting in contact with the cushioning element (4) before the fuselage structure does with the crash absorption elements (5). In another embodiment, these elements enter in contact at the same time in case of a crash event or in an opposite way with respect to the previous embodiment, that is the fuselage structure enters first in contact with the crash absorption elements (5) and then the fuel storage tank (11) gets in contact with the cushioning element (4). In an embodiment, the mentioned elements are arranged with the appropriate gaps there between to define the desired sequence of contacts.

In the embodiment shown in FIG. 2, the crash absorption assembly (5) extend further the length of the cushioning element (4) and further the length of the fuel storage tank (11).

Also in the embodiment shown in FIG. 2, the cushioning element (4) length matches with the length of the first fuel storage tank (11). In other embodiments, the cushioning element (4) extends further the length of the first fuel storage tank (11) in order to provide additional protection to other elements located in the surrounding area of said first fuel storage tank (11).

Figure 3:
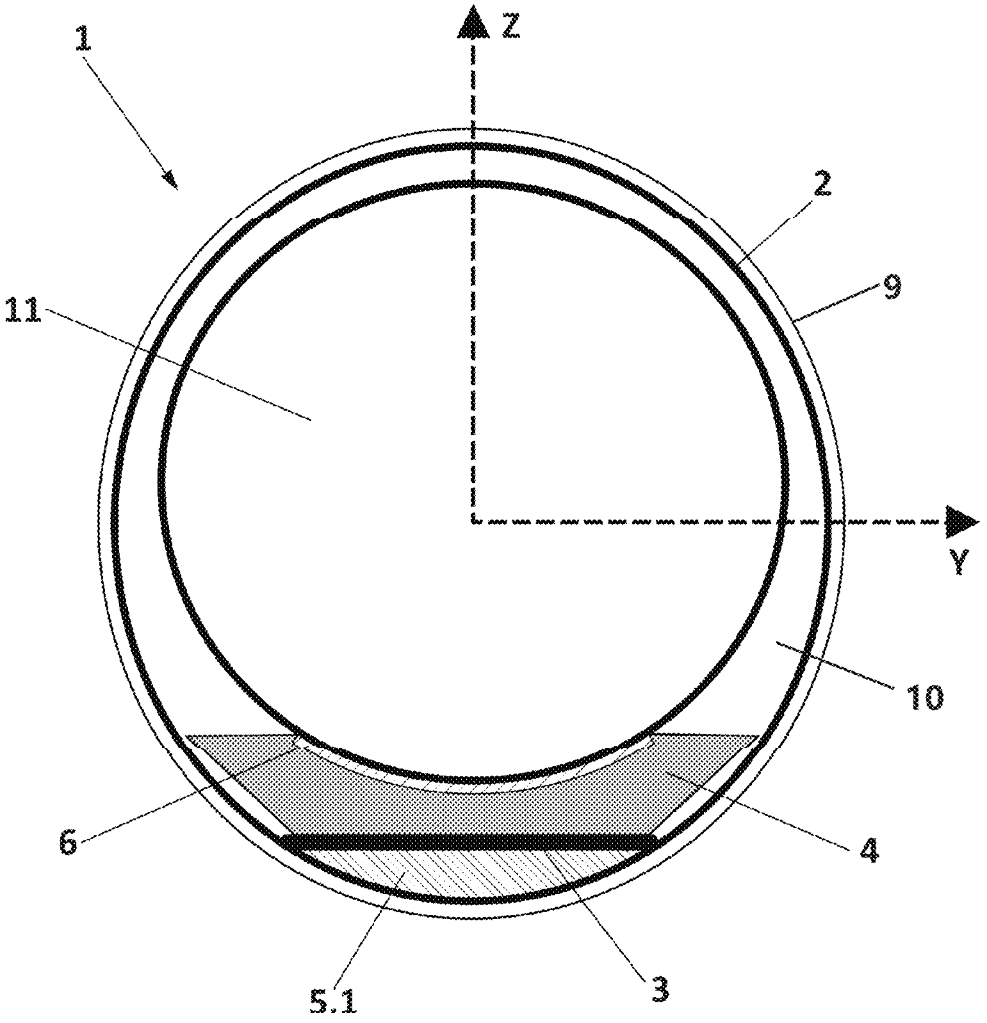
FIGS. 3 to 5 are schematic representations of a cross-sectional views of an aircraft fuselage section according to an embodiment of the invention.
Figure 4:
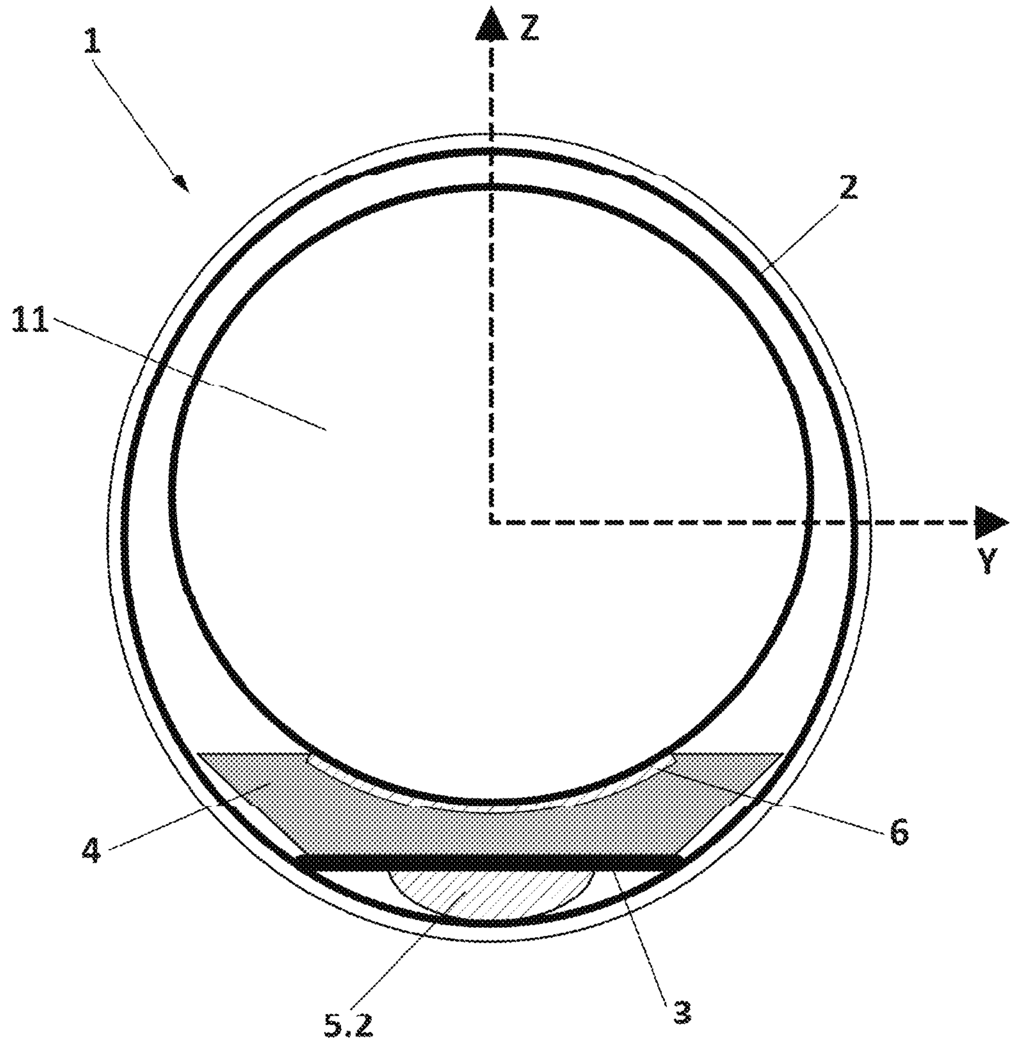
Figure 5:
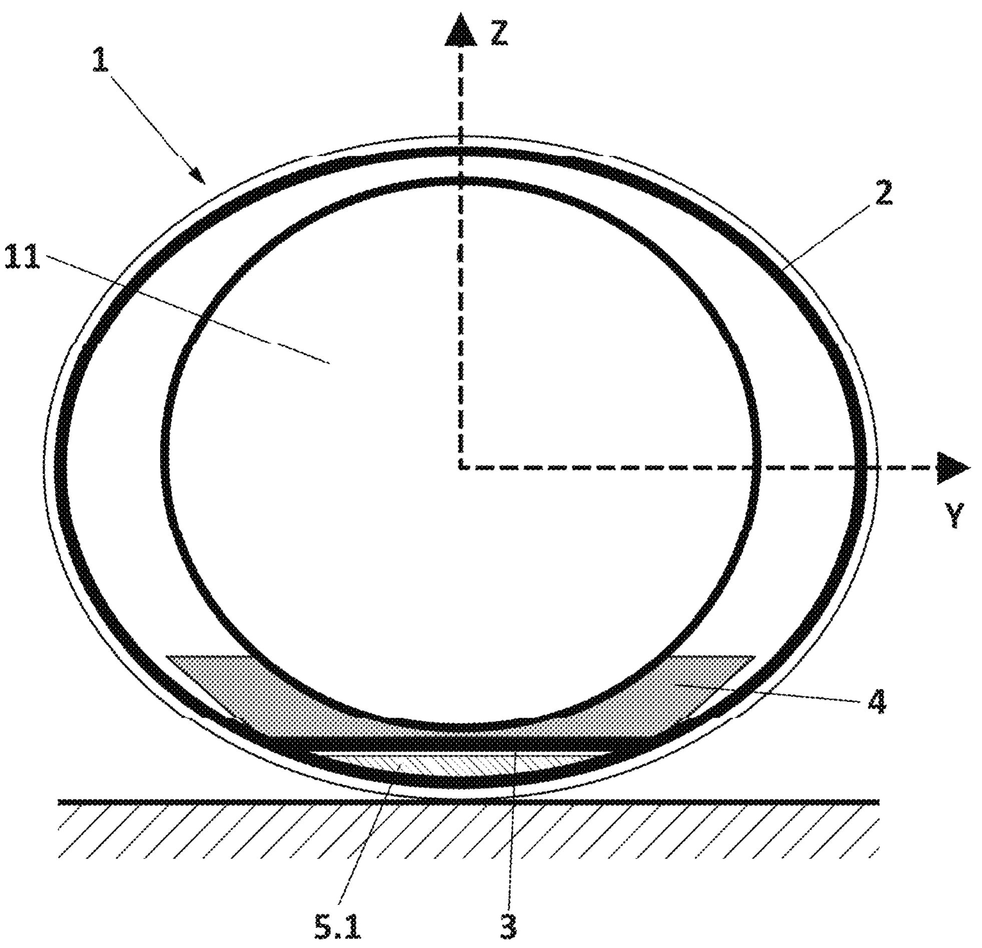

FIGS. 3 to 5 show a schematic representation of a cross-sectional view of an aircraft fuselage section (1) according to an embodiment of the invention.

FIG. 3 depicts a cross-sectional view of the aircraft fuselage section (1), wherein the cross-sectional view shows the aircraft fuselage section (1) at a plane traversing a first absorption element (5.1), that is, the cross-section is performed along one frame (2) of the fuselage structure. In this embodiment, a first fuel storage tank (11) is arranged over the cushioning element (4). In this embodiment, the cushioning element (4) and the first fuel storage tank (11) are separated by a protective layer (6). As shown, the cushioning element (4) is arranged on the floor (3) and a first absorption element (5.1) is arranged between the fuselage structure and the floor (3), that is, the first absorption element (5.1) is arranged between the frame (2) of the fuselage structure and the floor.

FIG. 4 depicts a cross-sectional view of the aircraft fuselage section (1), wherein the cross-sectional view shows the aircraft fuselage section (1) at a plane traversing a second absorption element (5.2), that is, the cross-section is performed at a location between two successive frames (2) of the fuselage structure. In this figure, the aircraft fuselage section (1) includes a protective layer (6) located between the fuel storage tank (11) and the cushioning element (4). The cushioning element (4) is arranged on the floor (3) and the second absorption element (5.2) is arranged between the fuselage structure and the floor (3).

In other embodiments, not shown in FIGS. 3 to 5, the fuel storage tank (11) is arranged such that there is a gap between the fuel storage tank (11) and the cushioning element (4). In these embodiments, where a gap is located between the fuel storage tank (11), the aircraft fuselage section may optionally include a protective layer (6).

In an embodiment, the protective layer (6) is made of an elastomeric material.

In some embodiments, the plurality of frames of the fuselage structure has a rounded shape as shown in FIGS. 3 and 4.

FIG. 5 shows the same embodiment of the aircraft fuselage section (1) as shown in FIG. 3, but in the aircraft fuselage section (1) of FIG. 5 a deformation of the frame (2) has occurred due to a crash event. In this figure, it is shown the effect of compression loads which arise on the fuselage structure during said crash event, leading to a significant deformation of the fuselage structure.

In an embodiment, the aircraft fuselage section comprises a substantially cylindrical upper shell configured to maximize fuel tank storage capacity and a substantially vertical elliptical lower shell to enhance the crashworthiness capabilities of the fuselage structure to transfer the compression loads arisen during the crash event.

Figure 6:
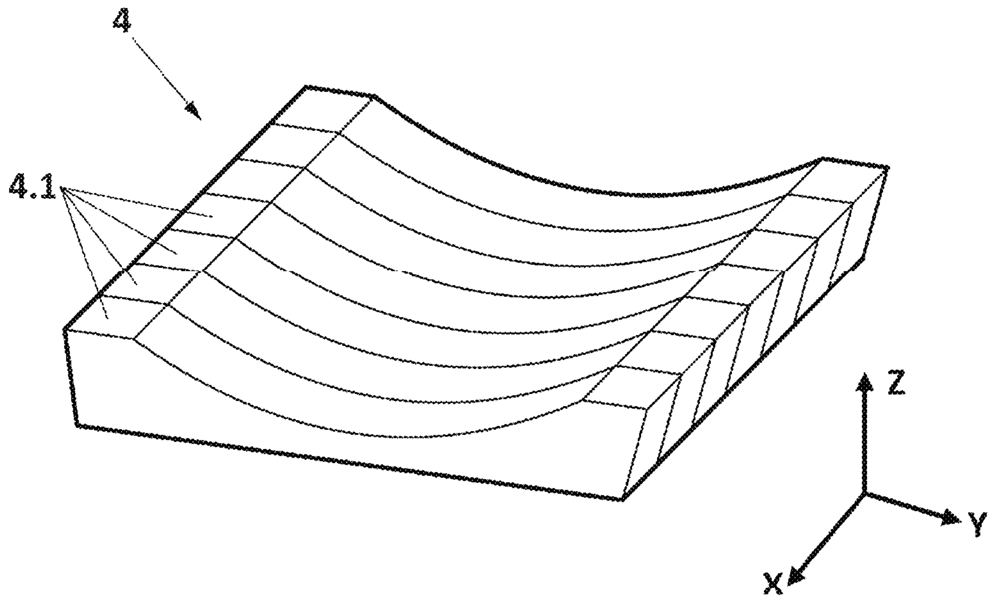
FIG. 6 is a schematic representation of a cushioning element according to an embodiment of the invention.

FIG. 6 depicts an embodiment of the cushioning element (4) where said cushioning element (4) has a plurality of cushioning portions (4.1) configured to be assembled with each other. In other embodiments, the cushioning element (4) has only one portion.

In other embodiments not shown, the cushioning element (4) is made of one portion which covers the length required.

In an embodiment, as shown in FIG. 6, the cushioning element (4) is concave-shaped. In some embodiments, the cushioning element (4) is concave-shaped in order to fit to the substantially cylindrical shape of a fuel storage tank as the one shown in the embodiments of FIG. 1, 3, 4 or 5.

In an embodiment, the cushioning element (4) comprises foam, permanent inflatable means or temporary inflatable means.

In an embodiment where the cushioning element (4) comprises foam, wherein the foam has different ranges of density to adapt the stiffness mechanical properties of the cushioning element (4) to a desired behavior. In that sense, the cushioning element (4) helps minimizing the stress level generated over the fuel storage tank surface area during the braking off. In some particular embodiments, the cushioning element (4) is fully made of foam. In other particular embodiments, only the outer surface of the cushioning element (4) is made of foam. In both particular embodiments, the cushioning element (4) has a specific thickness which allows said cushioning element (4) to enter in direct contact with the fuel storage tank in case of a crash event.

In an embodiment where the cushioning element (4) comprises permanent inflatable means, said permanent inflatable means are made of pneumatic material such as inflatable panels. The permanent inflatable means are filled to the required pressure in order to ensure the function of loads transfer to the floor (not shown in this figure) while minimizing the stress level generated over the fuel storage tank surface area. In an embodiment, the permanent inflatable means are filled with spheres, or other geometries, made of soft materials.

In an embodiment, both foam and permanent inflatable means can be combined as an embodiment. In an embodiment, the foam has a low stiffness value in order to protect the fuel storage tank surface area and the permanent inflatable means have a low to medium stiffness value. In some further embodiments, the inflatable means also includes an airbag with a regulation valve in order to control overpressure and absorb kinetic energy, for example, by gas expansion.

In an embodiment where the cushioning element (4) comprises temporary inflatable means such as airbags, said temporary inflatable means only inflates in case of a crash event through a pyrotechnic system or similar.

Figure 7:
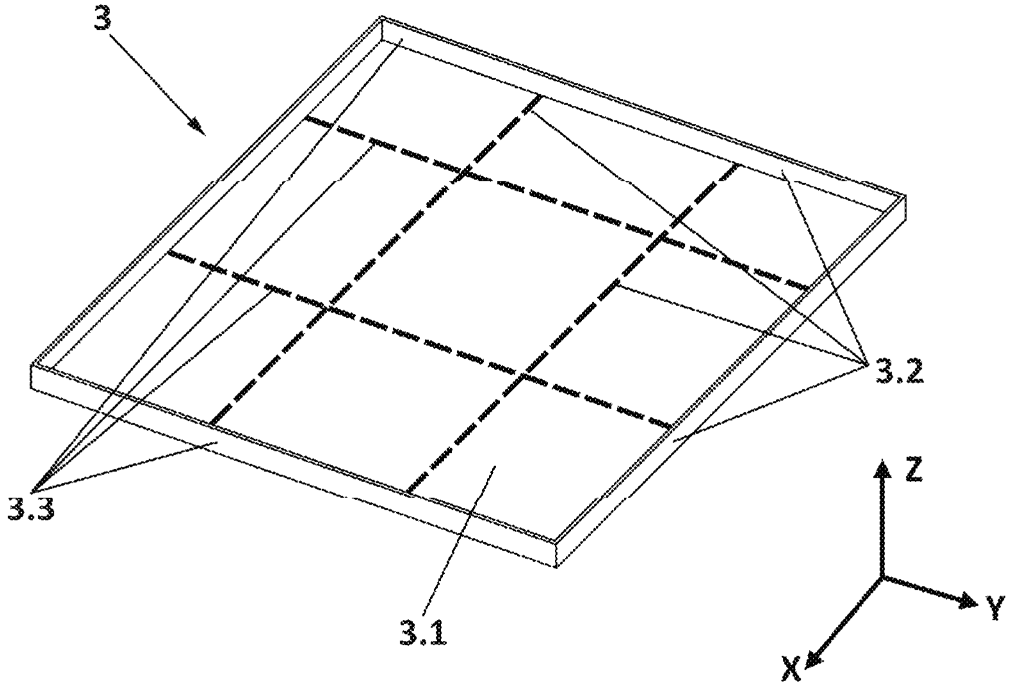
FIG. 7 is a schematic representation of a floor according to an embodiment of the invention.

FIG. 7 shows an embodiment of the floor (3), where said floor (3) includes a panel (3.1) and supporting elements (3.2, 3.3), the supporting elements (3.2, 3.3) comprising a plurality of longitudinal beams (3.2) extending in the longitudinal direction (X) and a plurality of transversal beams (3.3) extending perpendicularly to the longitudinal beams (3.2). Also, even if not shown in said FIG. 7, the longitudinal beams (3.2) and the transversal beams (3.3) are connected to the fuselage structure.

In an embodiment, the floor (3) is made of composite material and/or metal.

Figure 8:
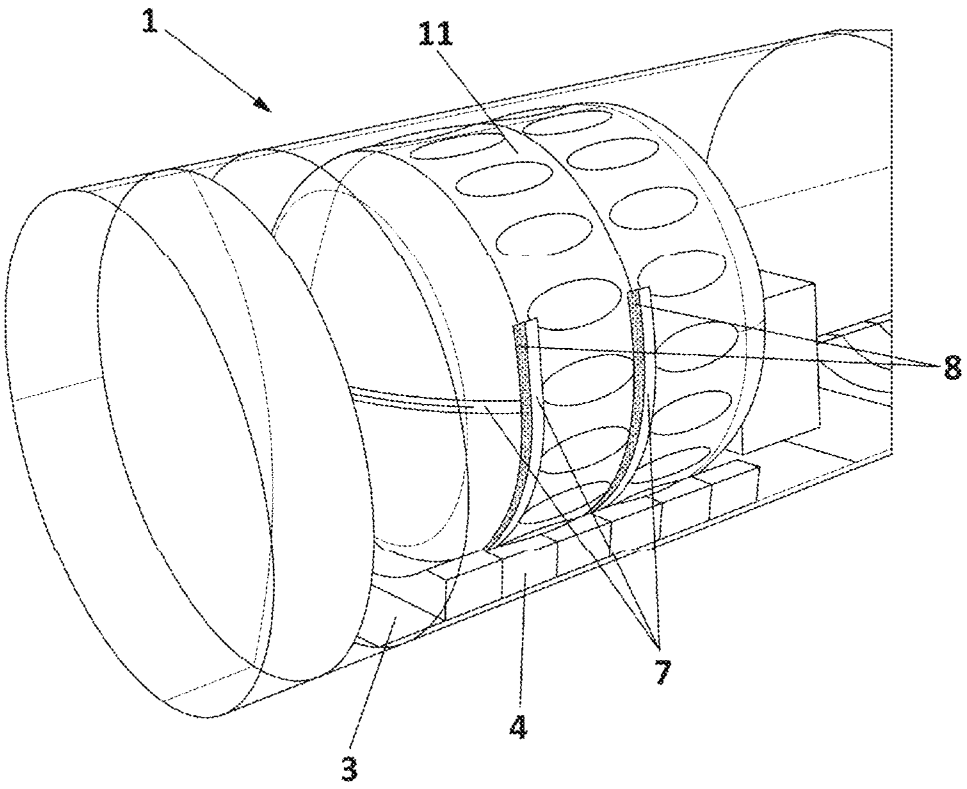
FIG. 8 is a schematic representation of the attaching fastener according to an embodiment of the invention.

FIG. 8 shows an embodiment of an aircraft fuselage section (1) comprising attaching fastener (7) configured to attach the first fuel storage tank (11) to the fuselage structure, for example to a frame of the fuselage structure.

As shown in FIG. 8, the aircraft fuselage section (1) includes a cushioning element (4) arranged on the floor (3). Although not visible in FIG. 8, crash absorption assembly are arranged between the floor (3) and the bottom part of the fuselage structure of the aircraft fuselage section (1).

In an embodiment, the attaching fastener (7) comprises lugs, fittings, rods, band-clamps, straps or any combination thereof. In the particular embodiment depicted in FIG. 8, the attaching fastener (7) are straps or band-clamps arranged around the fuel storage tank (11) for coupling said tank to the aircraft fuselage section (1).

In the embodiment shown in FIG. 8, the aircraft fuselage structure (1) comprises two safety belts (8) configured to retain the fuel storage tank (11) in case of a crash event. In the embodiment shown, the safety belts (8) are implemented as two straps or band-clamps attached to the fuselage structure, for example attached to frames of the fuselage structure.

Figure 9:
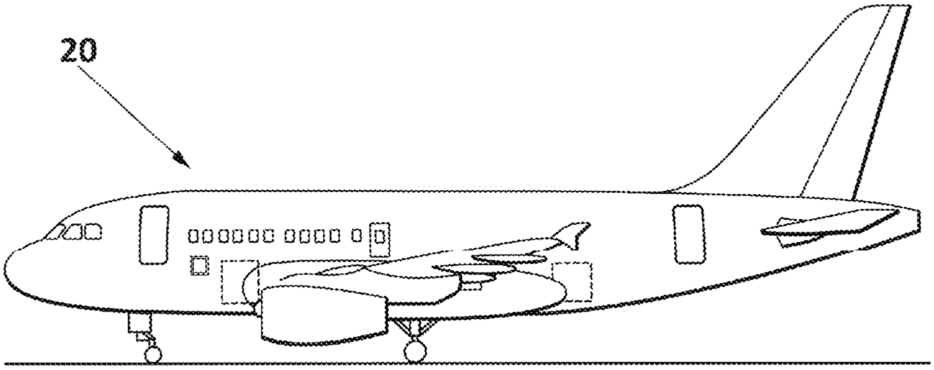
FIG. 9 is a schematic representation of an aircraft comprising an aircraft fuselage section according to an embodiment of the invention.

FIG. 9 shows an embodiment of an aircraft (20) comprising an aircraft fuselage section (1) according to an embodiment of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise.

Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft fuselage section extending along a longitudinal direction, the aircraft fuselage section comprising:

a fuselage structure comprising a plurality of frames;

a floor connected to the fuselage structure;

a cushioning element arranged on the floor, wherein the cushioning element comprises at least one of: a foam cushion, a permanently inflatable or expanded panel, a balloon or a temporarily inflatable structure, and a crash absorption assembly between the fuselage structure and the floor, wherein the crash absorption assembly includes first absorption elements and second absorption elements distributed along the longitudinal direction, wherein the first absorption elements and the second absorption elements are configured to dissipate and distribute energy;

wherein the first absorption elements are each arranged at a respective position corresponding to respective one of the frames of the fuselage structure;

wherein the second absorption elements are each arranged at a respective position between successive ones of the frames of the fuselage structure, and wherein a plurality of the second absorption elements extends in a vertical direction a majority of a distance between the floor and the frames.

2. The aircraft fuselage section according to claim 1, further comprising at least one fuel storage tank arranged over and supported by the cushioning element.

3. The aircraft fuselage section according to claim 2, further comprising a gap between the fuel storage tank and the cushioning element.

4. The aircraft fuselage section according to claim 2, wherein the aircraft fuselage section further comprises a protective layer between the fuel storage tank and the cushioning element.

5. The aircraft fuselage section according to claim 4, wherein the protective layer is an elastomeric material.

6. The aircraft fuselage section according to claim 2, wherein the aircraft fuselage section further comprises an attaching fastener configured to attach the at least one fuel storage tank to the fuselage structure.

7. The aircraft fuselage section according to claim 6, wherein the attaching fastener comprises at least one of lugs, fittings, rods, band-clamps, or straps.

8. The aircraft fuselage section according to claim 1, wherein the first absorption elements and/or the second absorption elements are made of at least one of: a metallic material, an aluminum alloy or a titanium alloy, a composite material, an epoxy resin, or a foam.

9. The aircraft fuselage section according to claim 1, wherein the first absorption elements and the second absorption elements are:

configured to undergo plastic deformation during a crash event; and/or configured to collapse and/or tear out during a crash event.

10. The aircraft fuselage section according to claim 1, wherein the floor comprises:

a panel, and supporting elements, wherein the supporting elements include a plurality of longitudinal beams extending in the longitudinal direction and a plurality of transversal beams extending perpendicularly to the longitudinal beams, and wherein the longitudinal beams and the transversal beams are connected to the fuselage structure.

11. The aircraft fuselage section according to claim 1, wherein the floor is a composite material and/or a metallic material.

12. The aircraft fuselage section according to claim 1, wherein the cushioning element comprises a plurality of cushioning portions configured to be assembled with each other.

13. The aircraft fuselage section according to claim 1, wherein the cushioning element is concave-shaped.

14. The aircraft fuselage section according to claim 1, further comprising:

a cylindrical upper shell configured to enhance fuel tank storage capacity, and a vertical elliptical lower shell configured to enhance crashworthiness capabilities of the fuselage structure to transfer the compression loads arisen during the crash event.

15. An aircraft comprising the aircraft fuselage section according to claim 1.

16. An aircraft fuselage comprising:

a skin extending circumferentially around an interior of the aircraft fuselage;

frames covered and supporting the skin, wherein the frames extend around the interior of the aircraft and the frames are each arranged in a respective plane substantially perpendicular to a longitudinal axis of the aircraft fuselage, wherein the frames are spaced apart from each along the longitudinal axis;

a floor in the interior and supported by the frames;

a fuel tank within the interior and supported by the floor, wherein the fuel tank is configured to store liquid hydrogen;

a deformable cushion on the floor and between the fuel tank and the floor, wherein the cushion abuts a lower outer surface of the fuel tank along a majority of an entire length of the fuel tank, and a crash absorption assembly between the frames and the floor, wherein the crash absorption assembly is aligned with the fuel tank along a direction perpendicular to the longitudinal axis, and the crash absorption assembly includes first absorption elements and second absorption elements distributed along the longitudinal direction, wherein the first absorption elements and the second absorption elements are configured to dissipate and distribute energy;

wherein the first absorption elements are each aligned in a plane with a respective one of the frames and the first absorption elements are each between the respective one of the frames and the floor;

wherein the second absorption elements are each between successive ones of the frames along the longitudinal direction;

wherein a plurality of the second absorption elements extends a majority of a vertical distance between the floor and the frames, and wherein the deformable cushion includes at least one of: a foam cushion, a permanently inflatable or expanded panel, a balloon or a temporarily inflatable structure.

* * * * *